United States Patent [19]

Granning

[11] 3,747,948
[45] July 24, 1973

[54] VEHICLE SUSPENSION
[75] Inventor: Ole Granning, Detroit, Mich.
[73] Assignee: Granning Suspensions, Inc., Dearborn, Mich.
[22] Filed: Dec. 20, 1971
[21] Appl. No.: 209,640

Related U.S. Application Data
[62] Division of Ser. No. 45,613, June 12, 1970, Pat. No. 3,689,102.

[52] U.S. Cl............ 280/112 R, 280/124 R, 267/63
[51] Int. Cl............................................. B60g 11/00
[58] Field of Search................. 280/112, 112.1, 124; 267/63, 65

[56] References Cited
UNITED STATES PATENTS
| | | | |
|---|---|---|---|
| 2,742,302 | 4/1956 | Pointer | 280/124 F |
| 3,133,745 | 5/1964 | Granning | 280/112 R |
| 3,481,623 | 12/1969 | Campbell | 267/63 R |

Primary Examiner—Philip Goodman
Attorney—Edward A. Craig

[57] ABSTRACT

The vehicle suspension provides an axle assembly which may be mounted either on a truck-tractor or a truck-trailer. The suspension includes an axle which is suspended from the vehicle frame by means of a pair of elastomeric springs. A drawbar extends forwardly from the axle. The drawbar is connected, at its forward end, to structure depending from the vehicle frame. The connection includes resilient fastening means which permit some pivoting of the forward end of the drawbar about an axis transverse to the longitudinal axis of the drawbar and generally parallel to the axis of the axle. Lifting means are provided to raise the axle and associated wheels off the ground when desired. The vehicle suspension is adapted for use as a pusher type axle suspension for mounting on a truck forward of the drive axles thereof.

7 Claims, 4 Drawing Figures

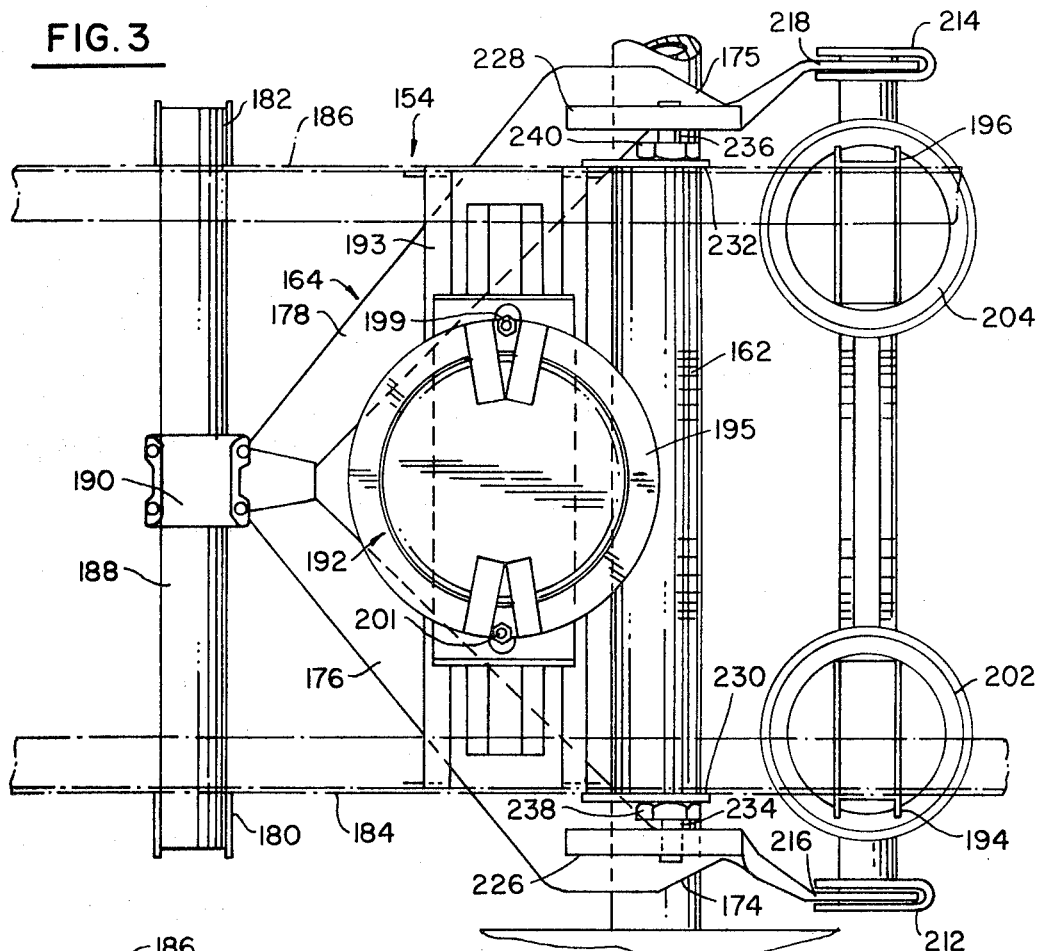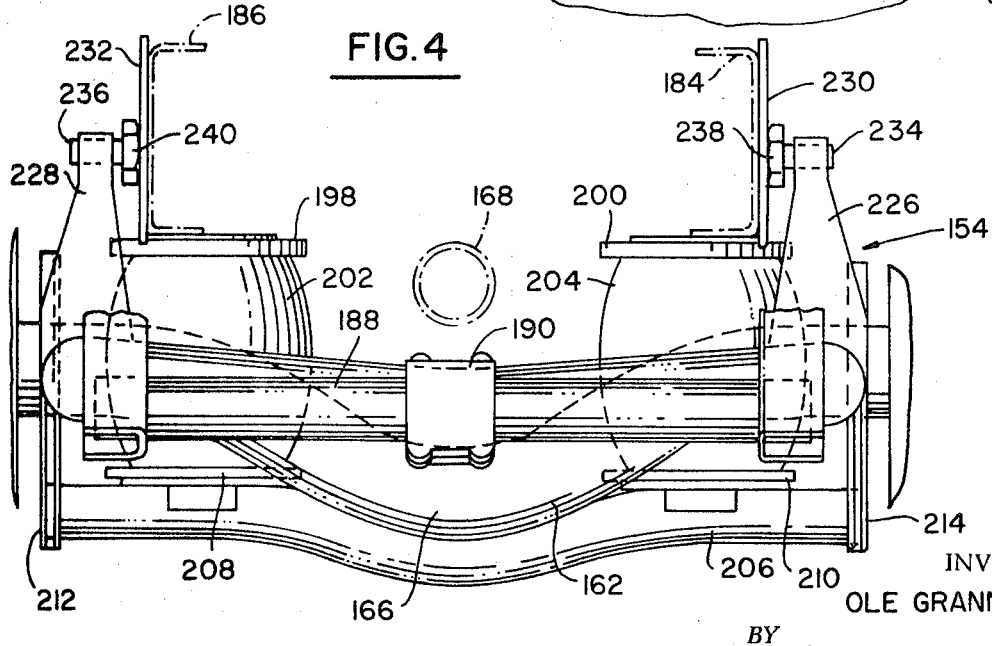

VEHICLE SUSPENSION

CROSS REFERENCE TO RELATED APPLICATION

This application is a division of application Ser. No. 45,613, filed June 12, 1970.

BACKGROUND OF THE INVENTION

In my United States Patent No. 3,133,745, issued May 19, 1964, I have disclosed a tandem suspension for tractors and trailers. The present invention constitutes an improvement over my prior structure.

It is frequently desirable to add an additional axle assembly to a truck-tractor or trailer to increase the load-carrying capacity of the vehicle. The maximum permissible load for each wheel of a truck is regulated by State Law. If additional wheel are provided on a truck the permissible truck load is increased thus permitting the trucker to haul a larger payload. In addition to complying with loading regulations, it is also desirable to add an extra axle when the load is to be increased in order to prevent undue wear on the vehicle.

My present invention provides an axle assembly which may be mounted on a truck to provide the desired additional axle. I have provided a suspension system including an axle which may be used as a pusher type axle located forwardly of a driven axle. This axle incorporated certain novel features in connection with the drawbar assembly and guide means therefor and in the axle configuration. A drawbar extends forwardly from the axle. I have provided a resilient fastening means for connecting the forward end of the drawbar to the vehicle frame which permits the forward end of the drawbar to pivot somewhat about an axis which is transverse to the longitudinal axis of the drawbar and generally parallel to the axle axis. This arrangement prevents hunting and seeking of the axle under certain conditions. For example, when the axle is in a lowered position as a result of a wheel being located in a depression on the roadway, the resilient fastening means will be pivoted and will urge the axle back to a level position. In prior constructions, the resilient connection would tend to strongly urge the axle back to its level position even when it should remain downwardly. For example, when the brakes are applied in prior devices, the axle tends to pop up when it should not. The present connection minimizes this tendency.

Additionally, I have provided elastomeric springs for this suspension as opposed to pneumatic or metallic springs as have been used in the past. Other features of the invention include a novel lifting arrangement to left the axle off the ground when there is no load on the vehicle thus saving tire wear and engine fuel.

SUMMARY OF THE INVENTION

The suspension is adapted for a vehicle having a frame. The suspension includes a suspension support structure separate from the vehicle frame. The suspension support structure is of a size and includes structure for mounting thereof on the vehicle frame. An axle is provided. A spring structure is securable to the vehicle frame and is connected to the axle for suspension of the axle. A drawbar extends outwardly from the axle towards the forward end of the suspension. Resilient fastening means are pivotable about an axis transverse to the longitudinal axis of the drawbar and generally parallel to the axis of the axle. Vertical drive means are provided. The vertical drive means comprise downwardly depending means defining guide surface structure for securement to the vehicle frame and vertically slidable structure secured to the axle for sliding engagement with the guide surface structure.

In the drawings:

FIG. 3 is a plan view of the vehicle suspension of FIG. 2; and

FIG. 4 is a front elevational view of the vehicle suspension of FIG. 2.

Figure 1:
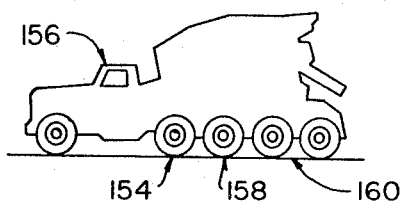
FIG. 1 is an elevational view of a truck illustratively having mounted thereon a pusher type axle vehicle suspension in accordance with one embodiment of the present invention.
Figure 2:
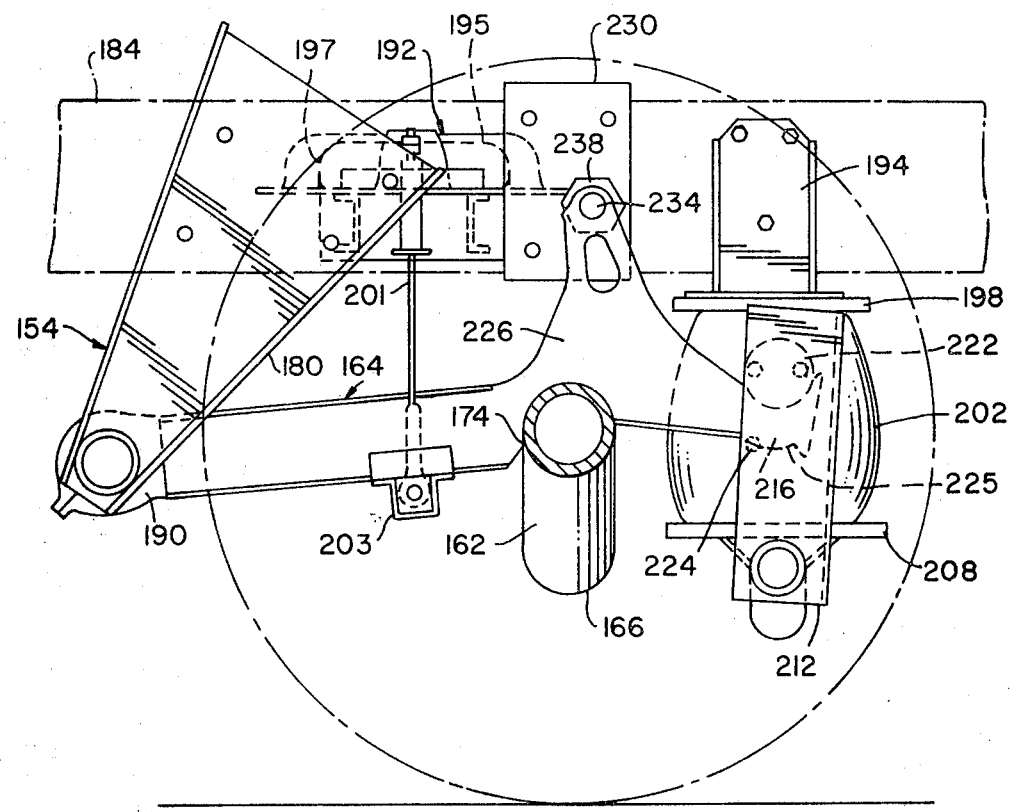
FIG. 2 is a side elevational view of the vehicle suspension of FIG. 1 in accordance with one embodiment of the present invention.

The pusher type axle suspension arrangement 154 illustrated in FIGS. 2–4 is adapted, as illustrated in FIG. 1, for mounting on a truck 156 forward of the tandem drive axles 158, 160 illustrated. For this reason, the suspension 154 is designated as a pusher type. However, the principles of the suspension may also be applied to a trailing type axle vehicle suspension which is mounted behind the driven axle of a tractor or is mounted on the trailer which is pulled by the tractor.

Referring more specifically to the structure illustrated in FIGS. 2–4, an axle 162 is supported at its center by means of a longitudinally extending drawbar-guide structure 164. The center portion 166 of the axle is curved downwardly to provide room thereabove for extension thereover of the drive shaft 168 (indicated in dotted lines) which must, of course, be accommodated to permit transmission of power from the engine over the axle 162 into connection with the driven axle 158, 160.

The drawbar portion of the structure 164 is welded at 174, 175 to the axle. As will be noted in FIG. 3, the drawbar portion includes inwardly converging legs 176, 178 which extend the points of attachment adjacent the outer ends of the axle into connection with each other at a point centrally located with respect to the axle to thus define a V-shaped configuration when viewed in plan. A pair of forwardly and downwardly V-shaped legs 180, 182 are bolted to the truck frame members 184, 186 (indicated in dotted lines).

A cylindrical support member 188 extends between the lower ends of the legs 180, 182. A coupling 190 extends from the juncture of the legs 176, 178 into engagement with the cylindrical member 188 centrally thereof. The coupling 190 is a resilient coupling pivotable about an axis transverse to the longitudinal axis of the drawbar portion of the structure 164 and generally parallel to the axis of the axle 162. The coupling may include an outer metallic sleeve coupling member on the drawbar having a longitudinal axis as described with a resilient elastomeric ring within the metallic sleeve as described in the aforesaid application Ser. No. 45,613, filed June 12, 1970.

A pair of brackets 194, 196 are bolted to the truck frame rearwardly of the axle 162. The brackets 194, 196 have generally horizontally extending plates 198, 200 secured thereto. A pair of elastomeric springs 202, 204 are connected at their upper end to the underside of the plates 198, 200. The springs 202, 204 are generally oval in cross-section in the unloaded condition as illustrated in FIGS. 2 and 4. When a load is applied the springs deform laterally and assume a somewhat doughnut shape under full load conditions. These springs are desirable from the cost standpoint and result in a maintenance-free life. Auxiliary shock absorbers are not necessary with this construction. The springs result in built-in damping. The springs are fabricated from a rubber-like elastomeric material.

A transversely extending cylindrical support element 206, also having a downwardly curved center portion, extends between and beyond the springs 202, 204. A flat horizontal plate 208, 210 is secured to the element 206, as by welding, beneath each of the springs 202, 204. The lower portions of the springs are bolted to the plates 208, 210, the springs being provided with metallic plates embedded into each end thereof.

An upwardly extending anchor element 212, 214 is provided at each outer end of the transverse element 206. The anchor elements 212, 214 are U-shaped and receive the rearwardly extending portions 216, 218 of the drawbar legs 176, 178. As will be noted in FIG. 2, a cylindrical locater element 222 is provided above each of the drawbar elements and is received in a curved recess. The element 222 is bolted in place. Another bolt 224 is provided beneath the end of the drawbar to thereby hold the drawbar securely in place. The lower surfaces 225 of the portions 216, 218 are curved to thereby permit limited pivoting. As will be appreciated, the structure described connects the drawbar to the springs 202, 204 and thus the axle 162 and the springs to the truck frame to thereby provide a resilient suspension for the entire assembly.

The guide portion 226, 228 extends upwardly from the drawbar legs 176, 178. A wear plate 230, 232 is bolted to the sides of the truck frame element in general alignment with the upper end of each of the portions 226, 228. A threaded opening is provided on the upper end of each of the portions 226, 228 to receive the threaded shank 234, 236 of a wear bolt having an enlarged head 238, 240. The wear bolts are in sliding contact with the plates 230, 232 and describe an arc, upon upward and downward movement of the axle 162, which extends from the lower right hand corner of the wear plates, as viewed in FIG. 2, towards the upper left corner. Both the wear plates and the wear bolts are fabricated of a hardened metal for long life. This structure serves to guide the axle suspension in its up and down movement during use without any pivoting of the guide structure about an axis parallel to the longitudinal axis of the drawbar portion of the structure 164. As either the wear plate or wear bolt is eroded as a result of the sliding contact, the wear bolts may be adjusted inwardly by threading the shanks towards the wear plates. Adjustment may also be made to accommodate differences in vehicle frame sizes.

An air lift structure 192 is provided between the truck frame and a support platform 193 to permit pneumatic lifting of the axle assembly when it is desired to lift the wheels off the ground. It is desirable to lift the axle upwardly to disengage the wheels from the surface of the roadway when the vehicle is not loaded in order to reduce drag caused by engagement of the wheels and to reduce wear on the tires. The lifting structure comprises a cup-shaped member 195 positioned above the axle 162. A pneumatic bellows 197 is provided within the member 195. The upper portion of the bellows 197 is against the member 195 while the lower portion of the bellows is supported by a support platform 193 (FIG. 3) which extends between the vehicle frame and members 186, 184 and is secured thereto. A cable 199, 201 is attached to diametrically opposite edge portions of the member 195. The cables extend through guide structures and are attached at the lower ends thereof to brackets 203 secured to the structure 164. When it is desired to raise the axle 162, air under pressure is injected into the bellows 197 causing the bellows to expand and lift the member 195 upwardly. The cables 199, 201 then raise the axle 162 against the action of springs 202, 204 causing the axle to be raised a sufficient distance to raise the wheels off the ground. The bellows 197 is exhausted when it is desired to lower the axle.

What I claim as my invention is:

1. In a suspension for a vehicle having a frame, comprising a suspension support structure separate from the vehicle frame, said suspension support structure being of a size and including structure for mounting thereof on the vehicle frame, an axle, a spring structure securable between the vehicle frame and said axle to resiliently support said axle, a drawbar extending outwardly from the axle towards the forward end of said suspension support structure, resilient fastening means pivotable about an axis transverse to the longitudinal axis of the drawbar and generally parallel to the axis of the axle securing the drawbar to the suspension support structure, and vertical guide means comprising downwardly depending means defining guide surface structure for securement to the vehicle frame and vertically slidable structure secured to the axle for sliding engagement with the guide surface structure, the combination of said vertically slidable structure and guide surface structure substantially preventing pivoting of the drawbar about its longitudinal axis.

2. A suspension as defined in claim 1, further characterized in that said suspension is adapted to be mounted forwardly of a drive axle, said suspension axle having a downwardly curved center portion to permit passage thereover of the vehicle drive shaft.

3. A suspension as defined in claim 2, further characterized in that said drawbar includes a pair of legs each secured at one end to the suspension axle adjacent an outer end of the suspension axle, said legs converging forwardly of the suspension axle to form a single coupling structure for securement to the resilient fastening means.

4. A suspension as defined in claim 3, further characterized in that each of said legs has a portion extending rearwardly from the suspension axle, said suspension support structure including a depending axle support structure at the rearward end of the suspension, said rearwardly extending portions of the drawbar legs being pivotally attached to said depending axle support structure.

5. A suspension as defined in claim 3, further characterized in that said vertically slidable structure secured to the suspension axle comprises a pair of upstanding elements secured to the rearward portion of the drawbar legs, wear plates securable to the vehicle frame in alignment with said upstanding elements and defining the guide surface structure, and guide elements on the upper portion of said upstanding elements for sliding engagement with the wear plates.

6. A suspension as defined in claim 5, further characterized in that said guide elements include means for adjustment thereof with respect to the wear plates.

7. A suspension as defined in claim 1, further characterized in the provision of a pneumatic lifting assembly for said axle comprising an inflatable lift element securable to the vehicle frame and a pair of spaced apart cables extending from said inflatable lift element into connection with the axle to lift the axle upon inflation of the inflatable element.

* * * * *